(No Model.)

P. HINKLE.
Safety Attachment for Elevator Cages.

No. 232,608. Patented Sept. 28, 1880.

Witnesses:
J. S. Boone
Wm. F. Clark

Inventor:
Philip Hinkle
by his Attys,
Boone & Boone.

UNITED STATES PATENT OFFICE.

PHILIP HINKLE, OF SAN FRANCISCO, CALIFORNIA.

SAFETY ATTACHMENT FOR ELEVATOR-CAGES.

SPECIFICATION forming part of Letters Patent No. 232,608, dated September 28, 1880.

Application filed June 9, 1880. (No model.)

*To all whom it may concern:*

Be it known that I, PHILIP HINKLE, of the city and county of San Francisco, in the State of California, have invented an Improved Safety Attachment for Elevator-Cages; and I do hereby declare that the following is a full, clear, and exact description thereof, reference being had to the accompanying drawings.

My invention relates to a novel arrangement whereby any unusual speed of the elevator-cage will automatically release the toggle-catches or dogs that arrest the fall of the cage.

Figure 1:
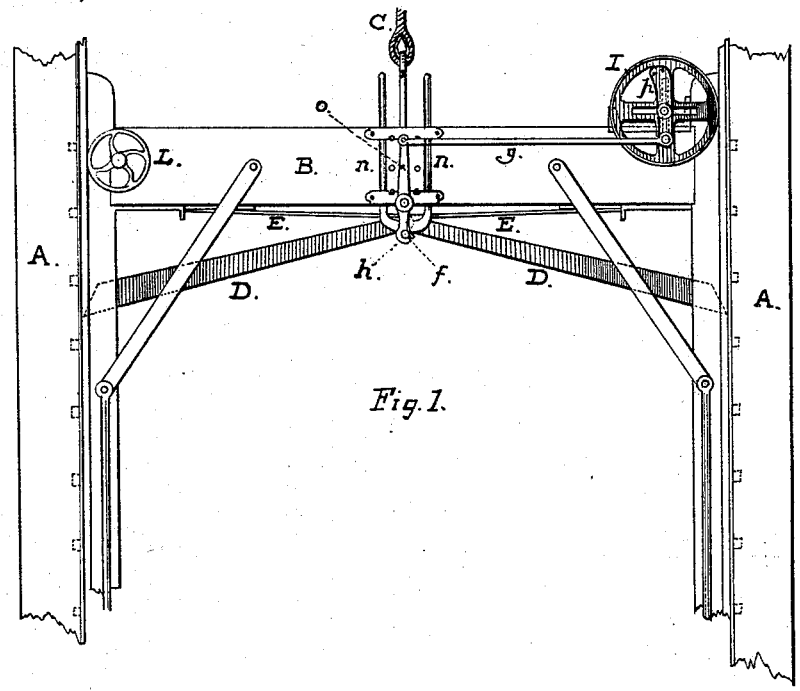
Figure 2:
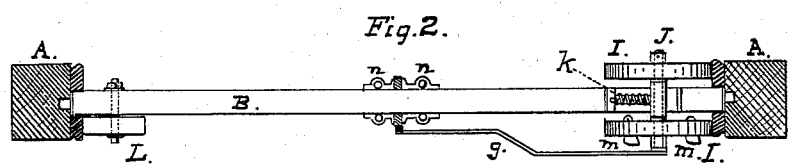
Figure 3:
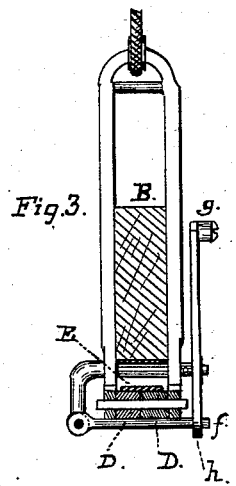
Figure 4:
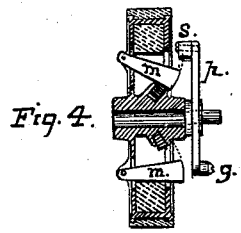

Referring to the accompanying drawings, in which like letters refer to like parts, Figure 1 is a view of the upper part of the elevator-cage, showing the safety-clutch. Fig. 2 is a horizontal section taken above the cross-head. Fig. 3 is a vertical section taken transversely through the cross-head. Fig. 4 is a sectional view through one of the tripping-pulleys.

Let A A represent the two upright guide-timbers between which the elevator-cage moves. B is the upper cross-timber of the cage, to which the hoisting-rope C is attached. D D are the two toggle-levers or dogs, the outer ends of which are pointed or beveled and pass through the sides of the cage, so that when their meeting or jointed ends are forced downward by the spring E the beveled or sharpened ends of the levers will serve as pawls to dig into the upright timbers and arrest the downward movement of the cage.

Heretofore it has been the practice to connect the hoisting-rope with the meeting ends of the levers, so that the pull of hoisting the cage would draw them up and keep their pointed outer ends inside of the upright timbers; but this rendered the operation of the dogs uncertain, as the rope would often break on the opposite side of the suspending-pulley, in which case the spring would not be able to overcome the weight of the rope, and even when the rope broke close to the cage the weight of rope would often be sufficient to prevent the working of the dogs.

My invention consists in compressing the spring and securing the meeting or jointed ends of the toggles or dogs in their set position by means of a hinged pin, $f$, and hook or latch device $h$. I then mount a wheel, I, upon the cage so that its rim will bear against one of the two upright guide-timbers between which the cage moves, so that the travel of the cage and the friction of the wheel-rim moving against the upright timber will cause the wheel to rotate with a speed corresponding to the movement of the cage. Usually I will employ two wheels, as shown at Fig. 2, one on each side of the cross-timber C and upon opposite ends of a fixed shaft, J, which passes through the timber. This shaft I secure in a sliding box, and I arrange a spring, $k$, to press the box toward the timber, and thus keep the faces of the wheels pressed tightly against the upright timber.

To prevent any vibration of the cage I also mount a wheel or roller, L, on the opposite end of the cross-timber B, so that it will press against the opposite upright guide-timber, A. The faces of both these wheels can be covered with india-rubber or other frictional substance to increase the friction and insure rotation.

The wheel I is made with one or more radial slots, and in each slot I suspend a weighted arm, $m$, by means of a pivot at one end, as shown at Fig. 4, the pivoted end being on the inner side of the wheel, while the opposite end of the arm projects beyond the outside of the wheel. I have represented four radial slots and four arms, but any desired number can be used.

The jointed ends of the toggle-levers or dogs D D are connected with two guide-rods, $n\ n$, which pass through eyes on the side of the cross-beam B, and, as before stated, they are drawn up and retained by a swing-bolt, $f$, and hook or latch $h$. This hook or latch is pivoted to the cross-beam B, and it has a lever-extension, $o$, projecting upward above the pivot. The upper end of this extension or lever is connected with the lower end of a lever, $p$, which is suspended at its middle from the axle of the wheel I by a connecting-rod, $g$. The lever $p$ is suspended on the axle of the wheel I outside of the wheel, and stands vertically, as shown at Fig. 4. It has a projection or lug, $s$, on the inside of its upper extremity, which projects close up to the side of the wheel.

Now, when the cage moves at its ordinary or proper speed the wheel I will rotate at a corresponding rate of speed, and the hinged weights or arms $m$ will drop to the center as they are carried around the upper half of the wheel and drop toward the circumference of the wheel as they pass the lower half of the circle. They will thus miss the projection or lug *s* on the lever *p*; but should the rope break, or should the cage attempt to move downward at an unusual rate of speed, the increased rotation of the wheel I will cause the arms *m* to fly out and strike the projection *s* and force it to one side, thus unhooking the latch *h*, so that the hinged bolt *f* will swing down and free the toggles. The spring E will then force the toggles down so as to dig their outer sharpened points into the upright guide-timbers, and thus stop the cage.

I thus provide for operating the dogs by a device which is entirely independent of the rope, so that their action is not impeded and the stopping of the cage insured.

Having thus described my invention, what I claim, and desire to secure by Letters Patent, is—

The friction-wheel I, mounted on the side of the cage so as to be rotated by the movement of the cage and the friction of its face against the upright guide-timbers A, and having the hinged arms or weights *m*, in combination with the lever *p*, with its projection *s*, connecting-rod *g*, hook-lever *h*, and swing-bolt *f*, substantially as described.

In witness whereof I have hereunto set my hand and seal.

PHILIP HINKLE. [L. S.]

Witnesses:
  WM. F. CLARK,
  JNO. L. BOONE.